United States Patent Office 3,404,063
Patented Oct. 1, 1968

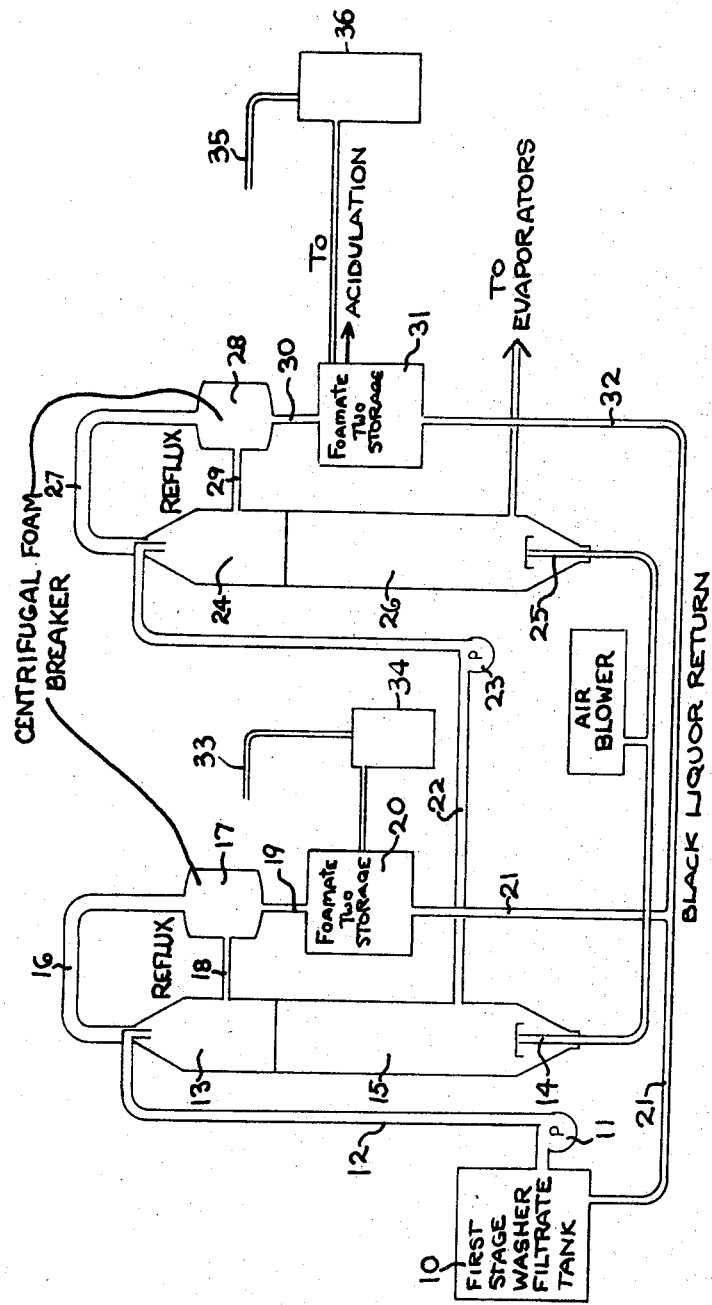

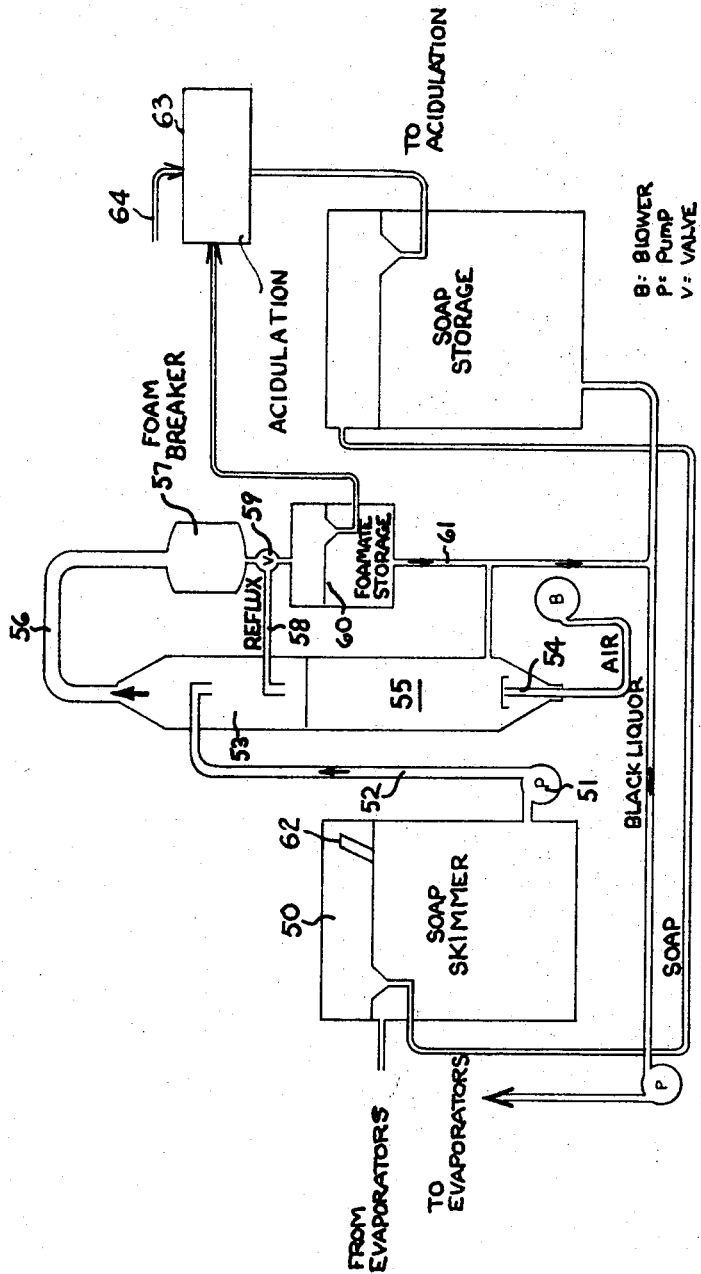

3,404,063
BY-PRODUCT RECOVERY FROM KRAFT BLACK LIQUOR
Charles I. Harding, Gainesville, Fla., assignor to Owens-Illinois, Inc., a corporation of Ohio, and Florida Engineering and Industrial Experiment Station of the University of Florida
Filed Dec. 28, 1964, Ser. No. 421,213
14 Claims. (Cl. 162—16)

ABSTRACT OF THE DISCLOSURE

An improvement in the process for the recovery of heat and chemicals from spent kraft black liquor produced in the cooking process of making paper pulp wherein prior to the burning of the black liquor in a recovery furnace a reactive oxygen-containing gas such as air or oxygen is bubbled through the black liquor to oxidize the black liquor and cause foaming of the liquor. The foam rises to the surface and is collected and mechanically broken and a portion of the broken foam or collapsed foam is recycled and the remainder is collected for recovery of by-products such as by acidulation to recover tall oil. The process may be carried out in several stages of foam fractionation to obtain improved recovery of fatty acid soap and resin acid soaps. Apparatus is shown for contacting the kraft black liquor with the reactive oxygen-containing gas, collecting the foam produced and for recycling at least a portion of the collapsed foam and recovering the remainder of the collapsed foam and equipment for treating said remainder with an acidulation agent to obtain the by-product such as tall oil.

---

The present invention relates to by-product recovery from kraft black liquor obtained from the cooking process in the production of paper pulp. More particularly, the present invention pertains to the recovery of tall oil from spent kraft black liquor obtained in the sulfate cooking process in the manufacture of paper pulp from Southern pine and similar woods.

A considerable amount of the paper pulp produced throughout the world is made according to the sulfate or kraft pulp process employing various woods that are almost exclusively coniferous woods. The sulfate process was developed to remove the large amounts of oil and resins which are contained in these woods. Southern pine which is used in very large amounts in the United States for production of paper pulp contains a very high concentration of a particularly valuable product comprising a mixture of fatty acids and resin acids known as tall oil. The recovery of tall oil from the spent black liquor is becoming increasingly important because of the wide commercial application and potential utilization of tall oil.

Tall oil contained in the black liquor is becoming increasingly important in the preparation of various materials including adhesives, binders, boring oils, detergents, emulsifiers, flotation reagents, fungicides, greases and the like. It has been estimated that because of the increased use of tall oil for such purposes the world capacity for the production of tall oil would be insufficient to meet the demand for such diverse purposes in the next few years.

The methods that have been utilized heretofore for the recovery of tall oil from the black liquor produced in cooking processes in the manufacture of paper pulp have been inefficient and have permitted approximately ¼ of the available tall oil to escape recovery.

The essential steps or operations involved in the pulp process are carried out most conveniently utilizing logs which are debarked and reduced in chippers to small chips. Screening then separates the desired chips from the oversized chips and the sawdust. Chips of the desired size are then charged to digesters and the cooking liquor comprising essentially sodium sulfide and caustic soda is added together with live steam to supply heat. Many types of digesters are employed; usually pressure vessels to permit the pressure cooking for several hours. At the end of the cook, the charge is blown into a pit for washing. The spent cooking liquor which is known in the art as "black liquor" or "kraft black liquor" is drained from the pulp and is pumped to storage or to recovery systems. The washed pulp is filtered to remove most of the water. The thickened pulp can be then bleached as desired during a single stage or multi-stage bleaching process depending on the desired color of the produced paper. After bleaching, the pulp is again washed and rethickened and it generally can be made into sheets for further processing.

Important in the overall economic balance of the pulping process is the recovery of by-products from the spent black liquor produced in the cooking process. The black liquor drained from the pulp contains about 95 to 98% of the total alkali charged to the digesting system. Much of the alkali is present as inorganic salts which are desirable to recover in order to lower the total cost of the process. Very substantial amounts of organic compounds are also formed during the cooking process and are present together with the inorganic compounds. Most important of these are the sodium or other alkali salts of the fatty acids and resin acids which are contained in tall oil.

In addition to recovery of chemicals it is also important to the overall economic balance to recover the heat value of the black liquor. Therefore, it is customary to concentrate the black liquor in evaporators to remove the water and produce a liquor which will ignite and burn when sprayed in a furnace. Burning is carried out to recover the inorganic salts and other valuable chemicals. Not only is the recovery of sulfur, sulfur compounds, sodium compounds and the like achieved by the burning process, but steam is produced by the combustion of the organic portion of the black liquor and this steam is then used to supply the heat and moisture for the wood chip digesters. The concentrated black liquor can be burned to generate heat for absorption in associated heat exchanger apparatus which result in a very substantial improvement in the overall economic operation of the pulping process. Such recovery systems are well-known and have been widely used in this country as well as abroad.

Paper pulp mills that produce the spent black kraft liquor utilizing burning of black liquor for recovery of sulfur compounds and for heat regeneration are troubled with several problems which vary in severity. The gaseous sulfur losses, principally hydrogen sulfide and mercaptans, represent economic loss. In addition, depending on concentration, wind direction and the like, the venting of fumes may become objectionable because of potential air pollution. The largest single source of loss is the recovery furnace. In this unit the concentrated black liquor is burned to obtain heat from the organic matter cooked out of the wood and to recover the inorganic cooking salts. During combustion most of the inorganic salts drop to the bottom of the furnace where they are collected in a molten smelt bed. The atmosphere at the lower portion of the furnace is maintained in a reducing condition to permit sodium sulfate to be reduced to sodium sulfide when it contacts the smelt. The particles which remain suspended in the combustion gas are collected by effluent control devices such as electrostatic precipitators or venturi scrubbers.

It has been determined as a result of extensive studies that sulfur losses from the recovery furnace can be decreased as much as about 95% if the reduced sulfur compounds present in the black liquor are oxidized prior to introduction into the furnace. This process known as black liquor oxidation is usually accomplished by bubbling air through the black liquor. If the liquor is oxidized prior to the direct heat evaporators the sulfur loss from this unit is reduced. The oxidized sulfur compounds are less volatile and, hence, are not eluted readily by the hot combustion gases.

Another significant sulfur loss is from non-condensable gases released from the multiple effect evaporators. If the weak black liquor is oxidized prior to the multiple effect evoporators the loss of volatile sulfur compounds from this source would be reduced significantly.

Although West Coast pulp mills have used oxidation systems, excessive foaming of Southern pine black liquor has been the chief deterrent to weak black liquor oxidation by Southern mills. The foaming is caused by the large concentration of fats and resin in Southern pine wood. The highly alkaline kraft pulping liquor converts these compounds into their sodium salts. The salts or tall oil soaps as they are known are surface active and form a stable foam. The expensive equipment necessary to control this foam has made oxidation of Southern pine weak liquor appear to be economically unfeasible.

It has been estimated that projected requirements for tall oil will exceed by several times the supply presently at hand and, therefore, it has been increasingly evident that tall oil is rapidly becoming the most valuable by-product of kraft pulping. The recovered tall oil soap is acidulated with mineral acids such as sulfuric acid to form crude tall oil. Tall oil and its derivatives are used in a wide variety of applications including adhesives, binders, boring oils, detergents, emulsifiers, factices, flotation reagents, fungicides and glass oils, greases, linoleum, oilcloth, paint, paper size, penetrating oils, pigment wetting agents, plasticizers, polishes, printing inks, resins, rubber chemicals, soap, soluble oils, sulfonated oils, textile oils, varnishes, waterproofing agents and wetting agents. Because of its versatility, tall oil represents a very important basic material that cannot be wasted. Therefore, greater recovery efficiencies are necessary if projected needs are to be met.

The amount and composition of tall oil recovered varies widely with the species of wood that is utilized. Recoveries of 32 to 38 lbs. of crude tall oil per ton of pulp are reported for certain West Coast mills. Due to the higher concentration of fatty oils and the like in Southern woods, tall oil recovery of certain Southern mills is estimated to range from 60 to 100 lbs. of crude tall oil per ton of pulp. Generally, tall oil contains about 50% unsaturated fatty acids, chiefly oleic and linoleic acids; and about 50% resin acids such as palustric, levopimaric, abeitic, and and neo abeitic. Because of the large amounts of alkali present in the black liquor these acids are present as alkali salts of esters which are surface active in nature.

Current tall oil soap recovery practice calls for skimming the soap from the surface of the black liquor at a convenient point in the evaporation cycle. The precipitation of the soap is caused by the common ion effect of the dissolved sodium. When the solids content reaches 23 to 28% the common ion effect becomes sufficiently large to cause the tall oil soap to precipitate. The precipitated soap floats to the surface where it can be conviently skimmed. However, this allows from about 20 to 40% of the soap contained in the black liquor to remain in solution and escape recovery. This substantial loss represents a sizeable potential in terms of possible by-product income and represents at least a quarter of the total capacity for tall oil production today.

Accordingly, it is the object of the present invention to provide a method for improved by-product recovery from black liquor produced in paper plup manufacturing which avoids the shortcomings of the prior known methods.

It is a further object of the present invention to increase the quantity and quality of tall oil soap recovered from black liquor produced in paper pulp manufacturing and avoid the disadvantages of the prior known methods.

It is a further object of the present invention to provide a method for partially separating the fatty acid soap and resin acid soap contained in black liquor produced in paper pulp manufacturing.

It is a further object of the present invention to lessen the emission of gaseous reduced sulfur compounds in the effluent of the paper pulp manufacturing operation.

It is a further object of the present invention to provide apparatus for recovery of by-products from black liquor produced in paper pulp manufacturing.

It is a further object of the present invention to provide apparatus for continuous recovery of tall oil from black liquor produced in paper pulp manufacturing.

In attaining the above objects, one feature of the present invention resides in inducing extensive foaming in black liquor to improve by-product recovery by concentrating the desired by-product in the foam and subsequently causing collapse of the foam for by-product recovery.

A further feature of the present invention resides in the system of foam fractionation of black liquor to selectively concentrate by-product in the foam for subsequent collapse and recovery.

A further feature of the present invention resides in the selective separation of compounds of relatively high surface activity from a mixture of compounds containing those of relatively low surface activity by foam fractionation of black liquor to obtain improved by-product recovery of the fatty acid soaps and the resin acid soaps contained in black liquor.

A further feature of the present invention resides in the use of a plurality of oxidation stages to obtain a selective partial separation of compounds of relatively high surface activity from compounds of relatively low surface activity.

A still further feature of the present invention resides in a two stage oxidation process wherein the flow rate of the oxidizing agent is different in each stage so as to obtain a selective separation and partial removal of one component of the by-product from the other components.

The above objects and features of the present invention as well as other objects, features and advantages thereof will become apparent from the following detailed description thereof taken in conjunction with the drawings wherein:

FIG. 1 is a schematic diagram of a recovery system showing multiple stage oxidation wherein the black liquor is subjected to the foam fractionation; and FIG. 2 is a schematic diagram of an alternative process wherein a single stage foaming operation is applied to skimmed black liquor.

Referring now more particularly to FIG. 1, illustrating the multiple stage embodiment of the invention, the process is carried out utilizing a black liquor obtained from the pulping process which can be collected in a first stage washer filtrate tank 10 from where it proceeds by way of pump 11 and conduit 12 to a first stage oxidation foam column 13. In this vessel, which can be of any covenient configuration, an oxygen-containing gas such as air is introduced by means of a sparger 14 and bubbled up through the black liquor 15, causing foaming of the liquor. Any type of bubble producer can be used such as an orifice, mechanical bubble producer or fritted glass diffuser. The foam rises to the surface of the liquor and is conducted by conduit 16 to the foam breaker 17 where the foam is collected and broken to form collapsed foam.

A portion of the collapsed foam called "foamate" varies in solute concentration from the black liquor and is returned to the top of the first oxidation stage column 13 as reflux in conduit 18. A valve (not shown) can be employed to regulate the reflux volume and to vary the ratio of reflux to product. The remainder of the foamate is conducted in conduit 19 to a foamate storage tank 20 to permit the black liquor to drain from the soap. The first foam fraction that is so separated is rich in fatty acid soaps that are present in the black liquor. The fatty acid soap can be treated with an acidulating agent through conduit 33 such as sulfuric acid in vessel 34 to obtain crude tall oil. The black liquor drained from the soap in the first foamate storage tank 20 can be returned to the first stage washer filtrate tank 10 through conduit 21 or pumped to evaporators (not shown).

Black liquor is withdrawn from below the surface in the first oxidation stage foam column 13 through conduit 22 and is pumped by pump 23 to a second oxidation stage foam column 24. Oxygen-containing gas is introduced through a sparger 25 and bubbles up through the pool of black liquor 26. It is usually necessary that the gas be introduced at a higher rate in the second oxidation foam column than in the first oxidation foam column. Foam produced as a result of the operation rises to the surface of black liquor 26 in the second oxidation column 24 and is conveyed through conduit 27 to the foam breaker 28 where the foam is collected and collapsed. A portion of the second foam fraction is recycled as reflux to the second oxidation column 24 through conduit 29. The remainder of collapsed foam is conveyed through conduit 30 to a second foamate storage tank 31 to permit drainage of the black liquor from the soap prior to acidulation in vessel 36 with acidulation agent through conduit 35 for tall oil recovery. The fraction obtained in the second oxidation stage is rich in resin acid soaps. The black liquor drained from the second foamate storage tank 31 can be returned to the first stage washer filtrate tank 10 through conduit 32. It may also be combined with the black liquor drained from the first foamate storage tank 20.

The foamate from the first column is enriched in fatty acid soaps while the foamate from the second column is enriched in resin acid soap. The crude tall oil is then recovered by acidulation with sulfuric acid. According to the described invention, overall soap recovery is increased and the conventional soap skimmer can be eliminated from the evaporator train. The sulfur compounds in the black liquor entering the evaporators will be oxidized and, thus, the corrosion problem in the evaporator tubes is considerably reduced and the sulfur losses in the evaporator condensate and non-condensables from the recovery furnace is likewise reduced.

An alternative system for application of the present invention is shown in FIG. 2 wherein the black liquor is conveyed from the evaporators (not shown) when the solids concentration reaches a suitable level to a black liquor collection or storage tank 50 wherein the soap is skimmed off the surface by conventional means 62. Generally the black liquor is conveyed from the evaporators when the concentration reaches about 23% to 28%, although this can be varied. The black liquor is pumped from the tank 50 by means of pump 51 through conduit 52 to the oxidation foam column 53. Air or other oxygen-containing gas is introduced through sparger 54 and bubbles up through the pool of black liquor 55 at a sufficient flow rate to produce foaming of the black liquor. The resulting foam rises to the surface and is conveyed in conduit 56 to foam breaker 57 where it is collected and collapsed. At least a portion of the collapsed foam is returned as reflux in conduit 58 to the oxidation column 53. The amount of reflux may be regulated by valve 59. The remainder of the collapsed foam is conveyed to the foamate storage tank 60 wherein excess soap is skimmed off. Black liquor drained from the foam in tank 60 can be returned in conduit 61 to the evaporators and combined with the black liquor leaving the oxidation column 53. The collapsed foam product and the recovered soap from the soap skimmer separately or together can be treated in vessel 63 with an acidulating agent through conduit 64 such as sulfuric acid to form crude tall oil. The soap from the foamate storage tank can be combined with the soap from the skimmer or processed separately. Application of the process at this point will result in increased tall oil yield and oxidation of the reduced sulfur compounds in the black liquor.

The following example will serve to illustrate the present invention but is not considered limiting thereof.

A foaming apparatus was employed similar to that pictured in FIG. 1 but with only one oxidation stage and consisted of a glass column open at the bottom and tapered at the top to a 24/40 ground glass joint. A fritted glass sparger and a mercurial thermometer were positioned in the column by inserting them through the rubber stopper used to plug the bottom of the column. The spargers were ⅝" x 2" tubular fritted glass filtering tubes. Compressed air from a central system entered the sparger after it had passed through a pressure reducing valve and a rotameter. From 3 to 9 p.s.i.g. air pressure was required to overcome the head loss through the sparger. Thus a pressure correction to the rotameter setting was required to obtain the desired flow rate.

The direction of the foam leaving the top of the column was changed 180° by passing it through a 3-inch radius (18 mm. I.D.) glass U tube or foam guide which discharged the foam into a centrifugal foam breaker. The foam breaker consisted of a 4-inch diameter stainless steel mesh basket with a 2-inch high wall. The basket was attached to a 6-inch long stainless steel shaft mounted on a small variable speed electric motor. The motor speed was controlled by a variac to give satisfactory foam breaking with a minimum of vibration. A 2000-ml. beaker was modified to serve as a foamate receiver by rounding the bottom into a hemisphere and by fusing a petcock to the bottom of the unit. A variac controlled heating tape was wrapped around the column to maintain the desired liquor temperature.

Black liquor was transported and stored in a stainless steel container. The top of the container was fitted with an electric motor which drove a propeller type stirrer. Nitrogen gas was used to displace the black liquor when samples were being drawn. The nitrogen blanket was necessary to preclude oxidation of the black liquor during storage. The difficulty of reconstituting the soap which separates from the black liquor during storage is well-known. In an attempt to maintain as much uniformity as possible in the amount of soap initially present in each run, all samples for a series of experiments with a given liquor were withdrawn from the storage vessel at one time. The samples were then stored in sealed volumetric containers until needed.

The general foaming procedure consisted of assembling the foam column of the specified diameter with the sparger, pouring a preheated 250-ml. sample of black liquor into the column, adjusting the temperature and gas flow rate, starting the foam breaker, and collecting a sample of foamate. When the foam became too unstable to reach the foam breaker, it was said to have broken. When the foam broke, gas flow was doubled and a second foamate fraction was collected. After the second foam broke, the volume of the bottoms (liquid left in the column) was measured and the apparatus disassembled for cleaning. The sulfide content of the feed liquor and bottoms was determined to permit calculation of the degree of oxidation.

After foaming, tall oil was extracted from both foamate fractions and from the bottoms. When operating conditions permitted the collection of two fractions of foamate, the extracted tall oil was esterified and analyzed by gas chromatography to determine the relative amounts of resin and fatty acids.

Analytical procedure and calculations

The black liquor sulfide content was determined using silver nitrate as a titrant. A Beckman H–2 A.C. line operated pH meter equipped with a Type E Beckman blue point glass electrode and a Beckman silver-silver sulfide electrode was used to detect the end point of the titration. The percentage of the black liquor sulfide oxidized during foaming was computed by the equation:

$$\text{Oxidation(percent)} = \left(1 - \frac{\text{sulfide concentration in bottoms (g./l.)}}{\text{sulfide concentration in feed (g./l.)}}\right) \times 100$$

The tall oil was extracted from the samples and the tall oil yield was computed by the equation:

$$\text{Tall Oil Yield (percent)} = \frac{\text{grams tall oil in foamate (s)} \times 100}{\text{grams tall oil in foamate (s)} + \text{grams tall oil in bottoms}}$$

The enrichment ratio is the quotient obtained by dividing the tall oil concentration in the foamate by the tall oil concentration in the bottoms. An indirect measure of the foamate volume was used. Assuming evaporation in the column was negligible, the combined volume of both foamate fractions equalled the initial volume less the volume of the bottoms. Enrichment ratio is calculated as follows:

$$\text{Enrichment ratio} = \left(\frac{\frac{\text{grams tall oil in foamate}}{\text{liters of feed-liters of bottoms}}}{\frac{\text{grams tall oil in bottoms}}{\text{liters of bottoms}}}\right)$$

The calculations of the response function for enrichment were based on the total tall oil in both foamate fractions rather than computing a separate ratio for each foamate fraction.

The quantity of tall oil present in the foamate was determined using gas chromatography systems. An F & M Corporation Model 720 gas chromatograph with a Model 1609 flame ionization detector was used as the analytical instrument.

Gas chromatographic analysis of tall oil requires that methyl esters be made of the organic acids to permit separation of the compounds on a polyester column. Methyl esters were prepared using diazomethane.

The 10′ x ¼″ chromatographic column was packed with 10 percent (wt.) of diethylene glycol succinate stationary phase on 60/80 mesh Gas-Chrom Z. The latter is an acid washed, silanized, diatomaceous earth solid support. Helium was used as the carrier gas. Hydrogen and compressed air were used to operate the flame ionization detector. Diethyl ether was used as a solvent for the methyl esters to facilitate injection into the chromatograph. A rubber stamp was prepared to permit entry of the pertinent operating information on each chromatogram immediately after it was run. The chromatograph was operated at a reasonably high attenuation factor (32×) to reduce background "noise" thus giving a smooth trace.

The length of time between injection of a mixture into a gas chromatograph and the emergence of a compound, as signified by a peak on the recorder chart, is a qualitative identification of the compound. The area under the peak is a quantitative measure of the amount of compound present.

Several factors affect foam fractionation and can be divided into two groups, as follows: (1) Fundamental variables each of which may be varied independent of the others; (2) Compound factors which are the result of the interaction of the above variables.

Fundamental variables include:

(a) The type of material. The natural surface active agents present in the black liquor follow Gibbs' equation. Materials that are not surface active in nature require complexing with a surface active agent if they are to be separated from a solution by foam fractionation.

In 1876, J. Willard Gibbs derived an equation which relates the degree of adsorption of surface-active compounds at a gas-liquid interface. This equation, generally known as the Gibbs Adsorption Equation has the usual form of:

$$[1] \qquad \Gamma_2 = -\frac{1}{RT} \frac{\partial \gamma}{\partial \ln a_2}$$

where: $\Gamma$ = surface excess (a portion of solution containing a unit area of gas-liquor interface contains $\Gamma$ more moles of solute than a portion of the interior which contains exactly the same quantity of solvent.)

$\gamma$ = the surface or interfacial tension.
$R$ = the gas constant.
$T$ = the absolute temperature.
$a$ = activity of the solute.

Thus at equilibrium and at constant temperature, the reduction and surface tension is a direct measure of the surface excess or the adsorption. This is a mathematically exact formula for a one solvent-one solute system. For a multiple solute system, the equation may be written as:

$$[2] \qquad d\gamma = -\Gamma_S d\mu_S - \Gamma_A d\mu_A - \Gamma_B d\mu_B \ldots - \Gamma_i d\mu_i$$

where: $\Gamma$ is the surface excess of the $i^{th}$ component.
$\mu_S$ is the chemical potential (partial molal free energy)
The relation of chemical potential and the activity for a solute is:

$$[3] \qquad \mu_A = \mu_A^\circ + RT \ln a_A$$

where: $\mu_A^\circ$ is standard chemical potential of species (A).

Equation 2 has been mathematically solved for one or two solutes. For a three or more solute system such as kraft black liquor, the equation is qualitative only, but does indicate that surface active species are selectively adsorbed at any gas-liquid interface with the resulting decrease in surface tension of the liquid solution.

(b) Concentration.—For mixtures exhibiting peaks of foam stability at various concentrations, foaming should be conducted at a concentration which gives a peak. If no peak occurs the foaming should be carried out at low concentration. For maximum efficiency described in grams of material removed per liter of air, foaming should be carried out at higher initial concentrations.

(c) pH.—Maximum enrichment is obtained at the isoelectric point.

(d) Temperature.—In general, increasing temperature hinders adsorption.

COMPOUND FACTORS (a) Solubility.—In principle, the material must be in solution for foam fractionation to apply. However, collodial and crystalline material have been successfully concentrated in foams.

(b) Surface tension.—This is the function of pH and concentration. It can be a useful guide in design and control of a foam fractionation column for a one or two solute system.

(c) Viscosity.—The higher the viscosity the wetter the foam and the lower the enrichment ratio.

(d) Equilibrium relationships.—Two types of equilibria operate in a foam system: chemical and physical. Chemical equilibria are not the same at the gas liquid interface as in the bulk liquid. The concentration ratio of the solute in the foamate to the solute in the bulk liquid is controlled by the distribution factor which, in turn, is a function of the bubble diameter and foam ratio. For systems containing only natural surface active solutes the equilibrium enrichment ratio usually ranges from one to five.

(e) Foam stability.—Unstable foam collapses in the column contributing internal reflux which tends to increase enrichment.

(f) Gas flow rate.—Increasing gas flow rate lowers the enrichment ratio.

(g) Bubble size.—Decreasing the size of bubble increases the film area, thus increasing the amount of surfactant transfer.

The difference in the surface activity between compounds makes it possible to use foam fractionation in the selective removal of a compound with high surface activity from a mixture of compounds with lower surface activity. Tall oil fatty acid soaps are much more surface active than tall oil resin acid soaps and once the bulk of the fatty acid soap has been removed the foaming conditions can be altered to remove the resin acid soaps in the foam.

As will be readily apparent, various modifications of the systems described in FIGS. 1 and 2 can be made without departing from the spirit and the scope of the present invention.

Whereas prior tall oil recovery processes are capable of recovering a maximum of approximately 75% of the tall oil present in the black liquor, recovery of up to 85 and 95% of the tall oil is possible using the process as described herein. Not only is the recovery remarkably improved as a result thereof, but the present process also improves the quality of the recovered tall oil by lowering the unsaponifiable pitch content below that usually encountered in crude tall oil.

I claim:

1. In a process for the recovery of heat and inorganic salts from spent kraft black liquor produced in the cooking process for making paper pulp wherein the spent kraft black liquor is concentrated and burned in a recovery furnace to recover the heat value and to recover the inorganic salts, the improvement which comprises, prior to the burning of said black liquor, intimately contacting the black liquor with a reactive oxygen-containing gas at a sufficient flow rate to subject the liquor to oxidation and to cause foaming of the liquor, the foam so produced rising to the surface of the said black liquor; conveying the foam away from the black liquor being contacted with said gas; collecting and mechanically breaking the foam so produced to obtain a collapsed foam; recycling a portion of the collapsed foam to the black liquor in contact with the reactive oxygen-containing gas and combining it therewith to be further contacted with the reactive oxygen-containing gas; the remainder of the collapsed foam being removed for recovery of by-products present therein after separation from residual black liquor.

2. In a process for the recovery of heat and inorganic salts from spent kraft black liquor produced in the cooking process for making paper pulp wherein the kraft black liquor is concentrated and burned in a recovery furnace to recover the heat value and to recover the inorganic salts, the improvement wherein the reduced sulfur compounds present in the said black liquor are oxidized prior to the burning of the black liquor to substantially lessen the emission of gaseous sulfur compounds, and whereby the amount of by-products recovered from said black liquor is increased, and which comprises, prior to the burning of said black liquor, introducing a reactive oxygen-containing gas into the said black liquor at a sufficient flow rate to provide intimate contact of said gas with said black liquor, to cause foaming of the liquor the foam so produced rising to the surface of said black liquor; conveying the foam so produced away from the kraft black liquor being contacted with said gas; collecting and mechanically breaking the foam to obtain a collapsed foam; recycling a portion of the collapsed foam to the said kraft black liquor in contact with said reactive oxygen-containing gas and combining it therewith to be further contacted with the reactive oxygen-containing gas; the remainder of the collapsed foam being removed for recovery of by-products.

3. In a process for making paper pulp according to the sulfate process wherein the kraft black liquor obtained in the cooking process is subsequently concentrated and burned in a recovery system to recover the heat value and to recover the inorganic salts present in the black liquor and wherein the reduced sulfur compounds present in said kraft black liquor are oxidized prior to said burning of the black liquor to lessen the emission of gaseous reduced sulfur compounds, the improvement whereby the amount of tall oil soap recovered from said black liquor is increased and which comprises, prior to the burning of said black liquor, introducing a reactive oxygen-containing gas into the kraft black liquor at a sufficient flow rate to provide intimate contact of said gas with said black liquor to cause foaming of the liquor, the foam so produced rising to the surface of said black liquor; conveying the foam so produced away from the kraft black liquor being contacted with said gas; collecting and mechanically breaking the foam to obtain a collapsed foam; recycling a portion of the collapsed foam to the kraft black liquor in contact with the reactive oxygen-containing gas and combining it therewith to be further contacted with the reactive oxygen-containing gas; the remainder of the collapsed foam being treated with an acidulating agent to recover the tall oil soap.

4. In a process for recovery of tall oil from kraft black liquor obtained in the sulfate process for making paper pulp wherein the kraft black liquor is concentrated and burned in a recovery system to recover heat value and inorganic salts, the improvement which comprises, prior to the said burning of the said black liquor, introducing a reactive oxygen-containing gas into the kraft black liquor at a sufficient rate to provide intimate contact of said gas with said black liquor and thereby oxidizing the reduced sulfur compounds present in said black liquor and causing foaming of the said liquor, the foam so produced rising to the surface of said black liquor; conveying the said foam away from the black liquor being contacted with said gas; collecting and mechanically breaking the foam to obtain a collapsed foam; recycling at least a portion of the collapsed foam to said kraft black liquor and combining the collapsed foam therewith to be further contacted with the reactive oxygen-containing gas; the remainder of the collapsed foam being removed and treated with an acidulating agent to obtain the tall oil product.

5. In a process for recovery of tall oil from kraft black liquor obtained in the sulfate process for making paper pulp wherein the black liquor is concentrated and burned in a recovery system to recover heat value and inorganic salts, the improvement which comprises, prior to the said burning of said black liquor, collecting the black liquor containing surface active agents obtained from the pulp process; maintaining the collected liquor quiescent for a time sufficient to float precipitated surface active agents present in the black liquor to the surface thereof to form a surface foam; collecting said foam by skimming the surface of the black liquor; conveying said skimmed surface active agents for subsequent treatment with acidulating agents; withdrawing at least a portion of the black liquor from beneath the surface of said collected black liquor; conveying said black liquor to an oxidation stage; introducing a reactive oxygen-containing gas into said black liquor at a sufficient rate to provide intimate contact of said gas with said black liquor and thereby oxidizing the reduced sulfur compounds present in said black liquor and causing foaming of said liquor the foam so produced rising to the surface of said black liquor; conveying the said foam away from the black liquor being contacted with said gas; collecting and mechanically breaking the foam to obtain a collapsed foam; recycling at least a portion of the collapsed foam as reflux to said black liquor and combining the collapsed foam therewith to be further contacted with the reactive oxygen-containing gas; the remainder of the collapsed foam being removed and treated with an acidulating agent to recover the tall oil product.

6. In the method as defined in claim 5 wherein the skimmed foam containing surface active agents collected prior to the oxidation stage are combined with the collected collapsed foam and treated together with an acidulating agent for the recovery of tall oil.

7. In a process for the recovery of heat and inorganic salts from spent kraft black liquor produced in the cooking process for making paper pulp wherein the spent kraft black liquor is subsequently ocnentrated and burned in a recovery system to recover heat value and inorganic salts, the improvement which comprises, prior to the burning of said black liquor, intimately contacting the said black liquor with a reactive oxygen-containing gas in a first oxidation stage at a sufficient flow rate to thereby oxidize the reduced sulfur compounds present in said liquor and to cause foaming of said liquor, the foam so produced rising to the surface of said liquor; conveying the foam so produced away from the kraft liquor contacted with said gas; collecting and breaking said foam to obtain collapsed foam; recycling at least a portion of the collapsed foam as reflux to the first oxidation stage containing the said kraft black liquor and combining the collapsed foam therewith to be further contacted with the reactive oxygen-containing gas; collecting the remaider of the collapsed foam produced in said first oxidation stage for subsequent acidulation and recovery of by-product components; withdrawing a portion of the black liquor beneath the foam in said first oxidation stage and conveying it to a separate second oxidation stage wherein a reactive oxygen-containing gas is introduced into the said black liquor at a higher flow rate than in the first oxidation stage to further oxidize the reduced sulfur compounds and to produce foam containing additional by-product components of said black liquor, the foam so produced rising to the surface of said black liquor in said second oxidation stage; conveying the foam so produced away from the black liquor being contacted in said second oxidation stage; collecting and mechanically breaking the foam to obtain a collapsed foam; recycling a portion of the second collapsed foam as reflux to the second oxidation stage; collecting the remainder of the collapsed foam obtained from said second oxidation stage containing a by-product fraction of said black liquor and treating said collected collapsed foam obtained in the process with an acidulating agent for recovery of said by-products.

8. In a process for the recovery of heat and inorganic salts from spent kraft black liquor produced in the cooking process for making paper pulp wherein the spent kraft black liquor is subsequently concentrated and burned in a recovery system to recover heat value and inorganic salts, the improvement which comprises, prior to said burning of said black liquor, introducing a reactive oxygen-containing gas into said black liquor in a first oxidation stage at a sufficient flow rate to cause foaming of the liquor, the foam so produced rising to the surface of said liquor; conveying the foam so produced, constituting a first foam fraction, away from said liquor being contacted with said gas; collecting and mechanically breaking said foam fraction to obtain collapsed foam; recycling a portion of said collapsed foam as reflux to the first oxidation stage containing said black liquor; collecting the remainder of said collapsed first foam fraction being rich in a selected component of said black liquor; conveying said first foam fraction for treatment with an acidulating agent for recovery of said selected component; withdrawing a portion of said black liquor from below the surface in said first oxidation stage and conveying said portion to a second oxidation stage wherein a reactive oxygen-containing gas is introduced into said black liquor at a higher flow rate than in the first oxidation stage to cause formation of foam rich in a selected second component of said black liquor; conveying the foam so produced, constituting a second foam fraction, away from said black liquor in said second oxidation stage; collecting and mechanically breaking said foam fraction to obtain collapsed foam; recycling a portion of said collapsed foam as reflux to the second oxidation stage containing said black liquor; collecting the remainder of said collapsed second foam fraction rich in a second selected component of said black liquor, conveying said second foam fraction for treatment with an acidulating agent for recovery of said selected component, said oxidation in said first and second stages oxidizing the reduced sulfur compounds present in said black liquor and thereby lessening the emission of gaseous reduced sulfur compounds in said burning of said black liquor.

9. In a process for the recovery of tall oil from spent kraft black liquor obtained in the cooking process for the production of paper pulp wherein the kraft black liquor is subsequently concentrated and burned to recover heat value and inorganic salts, the improvement wherein the amount of tall oil recovered is increased and wherein partial separation of the fatty acid and the resin acid components of the tall oil is obtained and which comprises, introducing a reactive oxygen-containing gas into the black liquor in a first oxidation stage at a sufficient flow rate to cause foaming of the liquor, the foam so produced rising to the surface of said liquor; conveying the foam so produced, constituting a first foam fraction, away from said black liquor being contacted with the said gas; collecting and mechanically breaking said foam fraction to obtain collapsed foam; recycling at least a portion of said collapsed foam as reflux to the first oxidation stage containing said black liquor; collecting the remainder of said collapsed first foam fraction being rich in the fatty acid component of tall oil obtained from the black liquor; conveying said first foam fraction for treatment with an acidulating agent to recover said fatty acid component; withdrawing a portion of said black liquor from below the surface in said first oxidation stage and conveying said portion to a second oxidation stage wherein a reactive oxygen-containing gas is introduced into said black liquor at a higher flow rate than in the first oxidation stage to cause formation of foam rich in the resin acid component of the tall oil present in the black liquor; conveying the foam so produced, constituting a second foam fraction, away from said black liquor in said second oxidation stage; collecting and mechanically breaking said foam fraction to obtain collapsed foam; recycling at least a portion of said collapsed foam as reflux to the second oxidation stage containing said black liquor; collecting the remainder of said collapsed second foam fraction rich in resin acids; conveying said second foam fraction for treatment with an acidulating agent for recovery of said resin acids.

10. In a process for the recovery of tall oil from the spent kraft black liquor obtained in the sulfate cooking process for making paper pulp from Southern pine wood wherein said kraft black liquor is burned for recovery of heat value and inorganic salts and wherein said black liquor contains reduced sulfur compounds which are oxidized prior to the burning of said black liquor to lessen the emission of gaseous sulfur compounds, the improvement whereby the amount of tall oil recovered from said black liquor is increased and wherein a partial separation of the fatty acid and resin acid components of the tall oil is obtained and which comprises, continuously collecting spent black liquor from the paper pulp process; continuously conveying the black liquor to a first oxidation stage; continuously introducing a reactive oxygen-containing gas into said black liquor in said first oxidation stage at a sufficient flow rate to cause foaming of the liquor, the foam so produced rising to the surface of said liquor; continuously conveying the foam so produced, constituting a first foam fraction, away from said liquor being contacted with said gas; continuously collecting and mechanically breaking the foam fraction to obtain collapsed foam; continuously recycling a portion of said collapsed foam as reflux to the first oxidation stage containing said black liquor; collecting the remainder of said collapsed first foam fraction being rich in the fatty acid component of tall oil obtained from the black liquor; and continuously treating said first foam fraction with an acidulating agent for recovery of said fatty acid component of the tall oil; continuously withdrawing a portion of said black liquor from below the surface in the first oxidation stage and continuously conveying said portion to a second oxidation stage wherein a reactive oxygen-containing gas is introduced into said black liquor at a higher flow rate than in the first oxidation stage to cause formation of foam rich in the resin acid component of the tall oil present in the black liquor; continuously conveying the foam so produced constituting a second foam fraction away from the black liquor being contacted in said second oxidation stage; continuously collecting and mechanically breaking said foam to obtain collapsed foam; continuously recycling at least a portion of said collapsed foam as reflux to said second oxidation stage containing said black liquor; continuously collecting the remainder of said collapsed second foam fraction rich in resin acids; and continuously treating said second foam fraction with an acidulating agent to recover the said resin acids fraction of tall oil.

11. In a process for the recovery of tall oil from the spent kraft black liquor obtained in the sulfate cooking process for making paper pulp from Southern pine wood wherein said graft black liquor is burned for recovery of heat value and inorganic salts and wherein said black liquor contains reduced sulfur compounds which are oxidized prior to the burning of said black liquor to lessen the emission of gaseous sulfur compounds, the improvement whereby the amount of tall oil recovered from said black liquor is increased and wherein a partial separation of the fatty acid and resin acid components of the tall oil is obtained and which comprises, continuously collecting spent black liquor from the paper pulp process; continuously conveying the black liquor to a first oxidation stage; gas into said black liquor in said first oxidation stage at a sufficient flow rate to cause foaming of the liquor, the foam so produced rising to the surface of said liquor; continuously conveying the foam so produced, constituting a first foam fraction, away from said liquor being contacted with said gas; continuously collecting and mechanically breaking the foam fraction to obtain collapsed foam; continuously recycling a portion of said collapsed foam as reflux to the first oxidation stage containing said black liquor; collecting the remainder of said collapsed first foam fraction being rich in the fatty acid component of tall oil obtained from the black liquor; and continuously treating said first foam fraction with an acidulating agent for recovery of said fatty acid component of the tall oil; continuously withdrawing a portion of said black liquor from below the surface in the first oxidation stage and continuously conveying said portion to a second oxidation stage wherein a reactive oxygen-containing gas is introduced into said black liquor to cause formation of foam rich in the resin acid component of the tall oil present in the black liquor; continuously conveying the foam so produced constituting a second foam fraction away from the black liquor being contacted in said second oxidation stage; continuously collecting and mechanically breaking said foam to obtain collapsed foam; continuously recycling at least a portion of said collapsed foam as reflux to said second oxidation stage containing said black liquor; continuously collecting the remainder of said collapsed second foam fraction rich in resin acids; and continuously treating said second foam fraction with an acidulating agent to recover the said resin acids fraction of tall oil.

12. Apparatus for the recovery of tall oil from the kraft black liquor obtained in the cooking process in the making of paper pulp comprising means for intimately contacting said kraft block liquor with a reactive oxygen-containing gas at a flow rate sufficient to cause foaming of the black liquor, means for conveying the foam so produced away from the black liquor being contacted with said oxygen-containing gas; means for collecting and mechanically breaking said foam to obtain a collapsed foam; means for recycling at least a portion of said collapsed foam to said black liquor being contacted with the reactive oxygen-containing gas as reflux; means for draining the remainder of said collapsed foam from retained black liquor and means for treating said remainder with an acidulating agent to obtain the tall oil product.

13. Apparatus for the recovery of tall oil from the kraft black liquor obtained in the cooking process in the making of paper pulp comprising means for collecting said kraft black liquor; means for skimming the surface of the collected black liquor to remove precipitated surface active agents; means for conveying the skimmed surface active agents to a collection tank; means to withdraw black liquor from below the surface of said means for collecting black liquor and conveying means connected thereto to convey black liquor to means for intimately contacting said black liquor with a reactive oxygen-containing gas at a flow rate sufficient to cause foaming of said black liquor; means for conveying the foam so produced away from the black liquor being contacted with said reactive oxygen-containing gas; means for collecting and mechanically breaking said foam to obtain a collapsed foam; means tfor recycling at least a portion of said collapsed foam to said black liquor being contacted with the reactive oxygen-containing gas as reflux; means for draining the remainder of said collapsed foam from retained black liquor and means for treating said remainder with an acidulating agent to obtain the tall oil product.

14. Apparatus for the recovery and partial separation of tall oil from the kraft black liquor obtained in the cooking process in the making of paper pulp comprising means for collecting said black liquor; means for conveying black liquor to a first oxidation vessel, said vessel being provided with means for introducing a reactive oxygen-containign gas into intimate contact with said black liquor contained therein and at a sufficient flow rate to cause foaming of said black liquor; means for conveying the foam so produced away from the black liquor in said vessel; means for collecting and mechanically breaking said foam to obtain a collapsed foam; means for recycling at least a portion of said collapsed foam to said first oxidation vessel as reflux; means for draining the remainder of said collapsed foam being rich in fatty acid component of said tall oil and means for collecting said fatty acid component; means for withdrawing a portion of said black liquor from below the surface of said first oxidation vessel; means for conveying said portion to a second oxidation vessel; said second oxidation vessel being provided with means for introducing a reactive oxygen-containing gas into intimate contact with said black liquor contained therein and at a sufficient flow rate to cause foaming of said black liquor; means for conveying the foam so produced away from the black liquor in said vessel; means for collecting and mechanically breaking said foam to obtain a second collapsed foam; means for recycling at least a portion of said second collapsed foam to said second oxidation vessel as reflux; means for draining the remainder of said second collapsed foam being rich in the resin acids components of said tall oil; means for collecting said component; means for treating said fatty acid component with an acidulating agent; and means for treating said resin acids component with acidulating agent for recovery of the tall oil present in said black liquor.

(References on following page)

References Cited

UNITED STATES PATENTS

| | | | |
|---|---|---|---|
| 2,027,115 | 1/1936 | Oman et al. | 260—97.5 |
| 2,758,017 | 8/1956 | Allen et al. | 162—31 |
| 2,771,460 | 11/1956 | Kooistra et al. | 159—47 |

OTHER REFERENCES

Cirves, Tall Oil Recovery, "The Paper Industry and Paper World," May 1943, pp. 149–151.

S. LEON BASHORE, *Primary Examiner*.